(12) United States Patent
Dobermann et al.

(10) Patent No.: US 8,243,377 B2
(45) Date of Patent: Aug. 14, 2012

(54) TELESCOPE

(75) Inventors: Dirk Dobermann, Magdala OT Ottstedt (DE); Dieter Rink, Solms (DE); Rainer Robotta, Jean OT Closewitz (DE); Kurt Becker, Wettenberg (DE); Georg Guenther, Grossschwabhausen (DE); Jens Hofmann, Jena (DE)

(73) Assignees: Carl Zeiss Sports Optics GmbH, Wetzlar (DE); Carl Zeiss AG, Oberkochen (DE)

( * ) Notice: Subject to any disclaimer, the term of this patent is extended or adjusted under 35 U.S.C. 154(b) by 360 days.

(21) Appl. No.: 12/470,790

(22) Filed: May 22, 2009

(65) Prior Publication Data

US 2009/0303586 A1    Dec. 10, 2009

(30) Foreign Application Priority Data

May 29, 2008   (DE) .......................... 10 2008 026 978

(51) Int. Cl.
   *G02B 7/02*   (2006.01)
(52) U.S. Cl. ........................................ 359/819; 359/399
(58) Field of Classification Search .......... 359/399–409, 359/554–557, 811–830, 896
   See application file for complete search history.

(56) References Cited

U.S. PATENT DOCUMENTS

| | | | |
|---|---|---|---|
| 3,845,929 A | 11/1974 | Reekie et al. | |
| 4,245,515 A | 1/1981 | Iwaya | |
| 4,465,346 A | 8/1984 | Fraser | |
| 4,982,502 A | 1/1991 | Weyrauch | |
| 5,029,995 A | 7/1991 | Weyrauch et al. | |
| 5,029,996 A | 7/1991 | Carter | |
| 5,089,911 A | 2/1992 | Weyrauch et al. | |
| 6,229,657 B1 * | 5/2001 | Holderer et al. | 359/822 |
| 6,369,946 B1 | 4/2002 | Ishijima et al. | |
| 6,549,337 B2 * | 4/2003 | Iizuka et al. | 359/557 |
| 2005/0055839 A1 | 3/2005 | Brenner et al. | |

FOREIGN PATENT DOCUMENTS

| | | |
|---|---|---|
| DE | 318227 | 1/1920 |
| DE | 2 239 426 | 2/1974 |
| DE | 2 414 061 | 12/1974 |
| DE | 28 34 158 | 2/1980 |
| DE | G 87 14 828.5 | 3/1988 |
| DE | 0 376 108 | 7/1990 |
| DE | 38 43 775 A1 | 7/1990 |
| DE | 38 43 776 A1 | 7/1990 |
| DE | 102 32 349 A1 | 9/2003 |
| WO | WO 99/54873 | 10/1999 |
| WO | WO 02/055971 A1 | 7/2002 |

* cited by examiner

*Primary Examiner* — Thong Nguyen
(74) *Attorney, Agent, or Firm* — Harness, Dickey & Pierce, P.L.C.

(57) ABSTRACT

A telescope has a joint for universally bearing an optical assembly in relation to a housing. The joint is designed as an elastic spring joint.

2 Claims, 9 Drawing Sheets

TELESCOPE

CROSS REFERENCE TO RELATED APPLICATION

The present application claims priority of German patent application No. 10 2008 026 978.6 filed on May 29, 2008.

BACKGROUND OF THE INVENTION

The invention generally relates to telescopes.

More specifically, the invention relates to a telescope having a joint for universally bearing an optical assembly in relation to a housing.

Telescopes of the above-mentioned type are generally known. The cardanic bearing of the assembly, usually of the inverting system of the telescope, serves the purpose of compensating dither motions which are transmitted by the user to the telescope. The problem of dither compensation arises chiefly in the case of telescopes of long focal length.

Known telescopes use mechanically complicated cardanic bearings which are associated with high production costs. Moreover, these telescopes are frequently sensitive to shock loads.

SUMMARY OF THE INVENTION

It is an object of the invention to develop further a telescope of the type mentioned at the beginning to the effect that the above-mentioned disadvantages are avoided. In particular, the aim is to be able to implement a dither compensation in a telescope which can be produced at lower cost and is simultaneously robust in use.

According to the invention, this object is achieved by a telescope, comprising a housing, an optical assembly arranged in the housing, a joint for universally bearing the optical assembly, the joint being designed as an elastic spring joint.

The use of elastic spring joints avoids expensive mechanical bearings. Spring joints are, moreover, less sensitive to mechanical shock loads.

In a first group of exemplary embodiments, the joint is a monolithic joint.

This measure has the advantage that the joint can be fabricated from one piece in a production process, and this lowers the production costs. The desired robustness can also be ensured by suitable dimensioning of the spring joint sites designed as thin material webs.

It is preferred in this case that the joint has a first joint part, a second joint part and a third joint part which are arranged next to one another along an axis, being provided between the first joint part and the second joint part are two first spring joint sites which form one piece with the first joint part and with the second joint part, furthermore provided between the second joint part and the third joint part are two second spring joint sites which form one piece with the second joint part and with the third joint part, furthermore the first spring joint sites forming a first joint axis, and the second spring joint sites forming a second joint axis, and finally the first joint axis being perpendicular to the second joint axis.

This measure has the advantage that an extremely compact joint results.

It is preferred in this case to design the spring joint sites as narrow material webs.

A particularly good result is obtained when each spring joint site has two material webs which are arranged on both sides of the associated joint axis, a thickened material region being provided between the material webs.

This measure has the advantage that the bending stress is distributed over two resilient material webs, and this reduces the local maximum load.

In a second group of exemplary embodiments, the joint is a membrane spring joint.

This measure has the advantage that the element that is resilient on both axes is of one piece.

The joint preferably has a first joint part, a membrane spring ring and a second joint part which are arranged next to one another along an axis, the first joint part being connected to a first radial region of the membrane spring ring, and the second joint part being connected to a second radial region of the membrane spring ring, furthermore the first radial region and the second region being respectively connected to a third radial region, which is arranged between the first and the second region, to be precise in each case only at two positions which are diametrically opposite one another relative to the axis, the positions of the first region defining a first joint axis, and the positions of the second region defining a second joint axis which is perpendicular to the first joint axis.

This measure also has the advantage that a particularly compact joint results.

The regions are preferably separated from one another by slots, in the shape of a circular arc, whose centre lies on the axis.

This measure has the advantage that the regions can be produced in a particularly simple way.

A good result is attained by virtue of the fact that the first region is held between a first mounting ring and the first joint part, that the second joint part has an axial projection which extends through the first mounting ring and the membrane spring ring onto the first joint part, and that the second region is held between a second mounting ring and the projection.

This measure has the advantage that the membrane spring ring is held in a stable way.

In a third group of exemplary embodiments, the joint is designed as a bending spring joint.

This measure has the advantage that the spring element has only regions subjected to bending stress, and so a relatively high load is permissible in the event of shocks.

A preferred embodiment of this variant is distinguished in that the joint has a first joint part, a first bending spring ring, a mounting ring, a second bending spring ring and a second joint part which are arranged next to one another along an axis, in that the first joint part is connected to the first bending spring ring at two first positions opposite one another relative to the axis, in that the mounting ring is connected to the first bending spring ring at two second positions opposite one another relative to the axis, the first and the second positions enclosing between them a first joint axis running perpendicular to the axis, in that the second joint part is connected to the second bending spring ring at two third positions opposite one another relative to the axis, in that the mounting ring is connected to the second bending spring ring at two fourth positions opposite one another relative to the axis, the third and the fourth positions enclosing between them a second joint axis which runs perpendicular to the axis and runs perpendicular to the first joint axis, and in that the joint axes lie in a common plane.

This measure also leads to a particularly compact design.

In this variant, it is preferred when the positions are formed by recesses in the bending spring rings.

This measure has the advantage that the spring characteristic can be set in a simple way by the dimensioning of the recesses in an identical starting component.

Moreover, it is preferred when the joint parts and the mounting ring have projections, pointing to one another and arranged offset over the circumference, and on whose radial end faces portions of the bending spring rings are fastened.

This measure has the advantage that the arrangement of the joint axes in a common plane can be easily implemented.

It is preferred in this case when the recesses are arranged between the projections.

This measure has the advantage that the position of the joint axes is clearly defined.

Furthermore, it is provided to this end that the end faces are arranged in a common plane.

In a fourth group of exemplary embodiments, the joint is a torsion spring joint.

This measure has the advantage that substantially no mixed loads occur here either.

A preferred practical embodiment of a torsion spring joint is distinguished in that the joint has a first joint part, a second joint part, a third joint part and a torsion spring part which are arranged inside one another and next to one another along an axis, and in that the torsion spring part has two first torsion bars, lying along a first joint axis, and two second torsion bars, lying along a second joint axis, the first torsion bars connecting the third joint part to the second joint part, and the second torsion bars connecting the second joint part to the first joint part.

The result is again here the advantage of a compact design.

It is particularly preferred in this case when the torsion spring part is produced in one piece from a bent wire, and the first and the second torsion bars are designed as straight torsion portions of the torsion spring part.

This measure has the advantage that the resilient element can be produced in a simple way from a suitably bent wire.

Furthermore, it is preferred when the joint parts are nested into one another axially at least in some portions and overlap one another axially, and the joint parts are designed in a common radial plane with holding means for the torsion spring part.

This measure likewise has the advantage that a compact design results.

In this case, the holding means can be designed as circumferential grooves in outer surfaces of the joint parts, as radial bores in the joint parts, and/or as axial pins in radial end faces of the joint parts.

In a fifth group of exemplary embodiments, the joint is a leaf spring joint.

In this case, a practical exemplary embodiment is distinguished in that the joint has a first joint part, a second joint part and a third joint part which are arranged next to one another along an axis, in that the first joint part is connected to the second joint part via two first leaf springs, which lie diametrically opposite one another relative to the axis and lie in a radial plane, in that the second joint part is connected to the third joint part via two second leaf springs, which are diametrically opposite one another relative to the axis and lie in the radial plane, in that the pairs of leaf springs define with their regions between the fastening points with the joint parts a first joint axis and a second joint axis, and in that the joint axes are perpendicular to one another.

Finally, it is preferred in this case when the joint parts have projections which point to one another and are arranged offset over the circumference, and on whose radial end faces the leaf springs are fastened.

This measure again has the advantage that the joint is of compact design.

Further advantages follow from the description and the attached drawing.

It goes without saying that the aforementioned and the features still to be explained below can be used not only in the respectively specified combination, but also in other combinations or on their own without departing from the scope of the present invention.

BRIEF DESCRIPTION OF THE DRAWINGS

Exemplary embodiments of the invention are illustrated in the drawing and will be explained in more detail in the following description. In the drawing.

DETAILED DESCRIPTION OF PREFERRED EXEMPLARY EMBODIMENTS

The invention relates to joints which are used in an optical device, in particular in a telescope, for elastic suspension of an optical assembly. The assembly, in particular an inverting system in a telescope, is intended to be stabilized by the suspension against dither motions in space. This preferably happens passively through the application of the necessary stabilization forces solely by the inertial forces of the mass of the assembly.

The joints are designed as cardanic spring joints. They have two joint axes which run perpendicular to one another, are defined by in each case two spring joint sites, and respectively permit a rotation by, for example, approximately ±5°. The joint axes in this case define a plane and intersect at a central point which lies on the axis of the substantially cylindrical joints. The spring joint sites are preferably equally removed from the central point.

Figure 1:
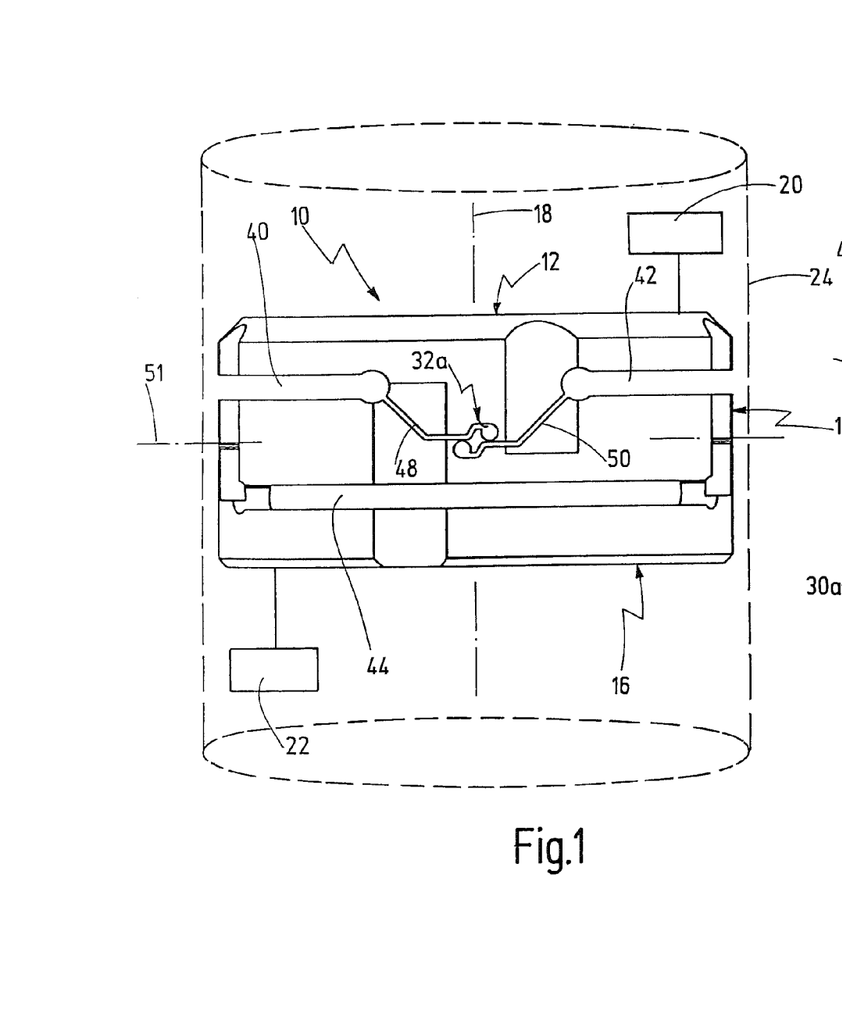
FIG. 1 shows a side view of a first exemplary embodiment of a joint according to the invention.
Figure 2:
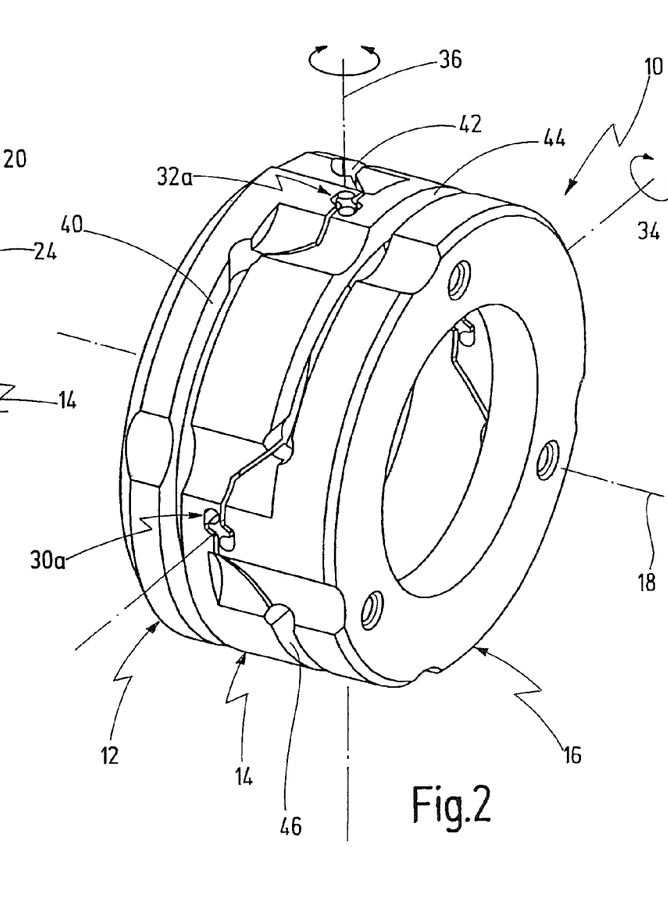
FIG. 2 shows a perspective view of the joint of FIG. 1.
Figure 3:
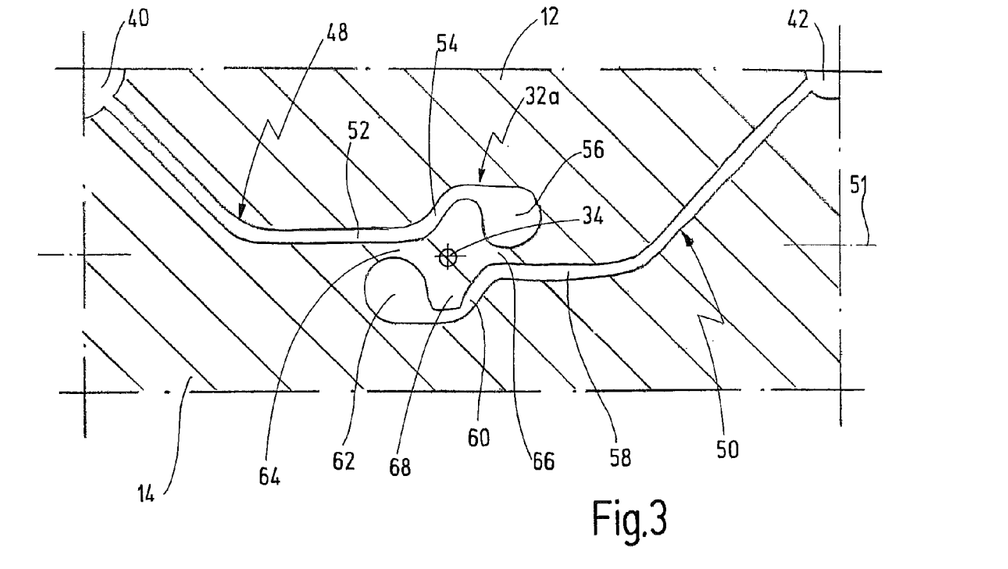
FIG. 3 shows a side view, on a greatly enlarged scale, of a monolithic joint site such as is used in the joint of FIG. 1.

FIGS. 1 to 3 show a first exemplary embodiment of a joint 10 according to the invention.

The joint 10 has a substantially cylindrical shape and is thereby adapted to the shape of a tube 24, customary with telescopes, into which it is inserted. The joint 10 has a first joint part 12—on the left in FIG. 2, a second joint part 14—in the middle in FIG. 2, and a third joint part 16—on the right in FIG. 2. The axis of the cylindrical joint 10 is denoted by 18, and the joint parts 12, 14 and 16 are arranged close to one another at only a slight spacing. The joint parts 12, 14 and 16 are monolithic, that is to say they consist of a common block. They are movably interconnected solely via spring joint sites, as is still to be explained.

The joint 10 serves the elastically movable connection of a housing, symbolized by 20, to an optical assembly, symbolized by 22, for example an inverting system in a telescope 22, which is indicated only schematically. To this end, the joint is provided with two pairs of spring joint sites, specifically a first pair, and a second pair, of which only the spring joint sites 30*a* and 32*a* are to be seen in FIGS. 1 and 2.

The first spring joint sites 30*a* lie diametrically opposite one another on the joint 10 and define a first joint axis 34 which runs transverse to the axis 18. The first spring joint sites 30*a* connect the second joint part 14 to the third joint part 16 such that these joint parts 14, 16 can be rotated in relation to one another about the first joint axis 34.

Offset by 90° in a circumferential direction in relation to the first spring joint sites 30*a* the second spring joint sites 32*a* thus likewise lie diametrically opposite one another on the joint 10 and define a second joint axis 36 which runs transverse to the axis 18 and to the first joint axis 34. The second spring joint sites 32*a* connect the first joint part 12 to the second joint part 14 such that these joint parts 12, 14 can be rotated in relation to one another about the second joint axis 36.

Since the joint parts 12, 14 and 16 are, as already mentioned, of monolithic design, this also applies, of course, to the spring joint sites 30*a* and 32*a*. The first joint part 12 is separated from the second joint part 14 by a first wide slot 40 and a second wide slot 42 which extend from both sides over approximately a third of the diameter. The corresponding statement holds for the second and the third joint part 14, 16 which, once again offset by 90° in a circumferential direction, are separated from one another by a third and fourth wide slot 44, 46.

In the remaining middle third, the joint parts 12 and 14 are furthermore separated from one another by a first narrow slot 68 and a second narrow slot 50, and there is also a corresponding situation for the joint parts 14 and 16. The narrow slots 68, 50 run in a region in which the joint parts 12, 14, 16 are hollow cylinders.

FIG. 3 now shows by way of example details of the monolithic spring joint site 32*a*. As is clearly visible, the narrow slots 48 and 50 lead from the wide slots 40 and 42 firstly obliquely into the region of a radial longitudinal middle plane 51 of the joint 10, in which the joint axes 34 and 36 lie. The narrow slot 48 merges there into a first straight portion 52 which then again departs from the longitudinal middle plane 51 along a first bent portion 54 in order then to terminate in a first widened end portion 56 which again extends up to near the longitudinal middle plane 51. The second narrow slot 50 with second portions 58, 60 and 62 runs in an axially symmetrical way.

This results in a shaping in the case of which the straight portions 52 and 58 and the widened portions 56 and 62 are opposite one another at a slight spacing on both sides of the longitudinal middle plane 51. Consequently, all that remains there is a thin web 64 or 66, respectively, with a narrow, rectangular material cross section. The first joint axis 34 is then located at the centre of a thickened region 68 remaining between the webs 64, 66.

If, now, the first joint part 12 is rotated in relation to the second joint part 14 about the first joint axis 34, the webs 64 and 66 are then bent. Consequently, in the illustration of FIG. 3 the first joint axis is displaced slightly upwards or downwards, but this causes no disturbance in the case of applications in a telescope. Owing to the above-described shaping with two webs 64 and 66, the bending stress is now distributed over these two webs 64 and 66 such that only a slight bending stress acts in each of the webs 64, 66.

Figure 4:
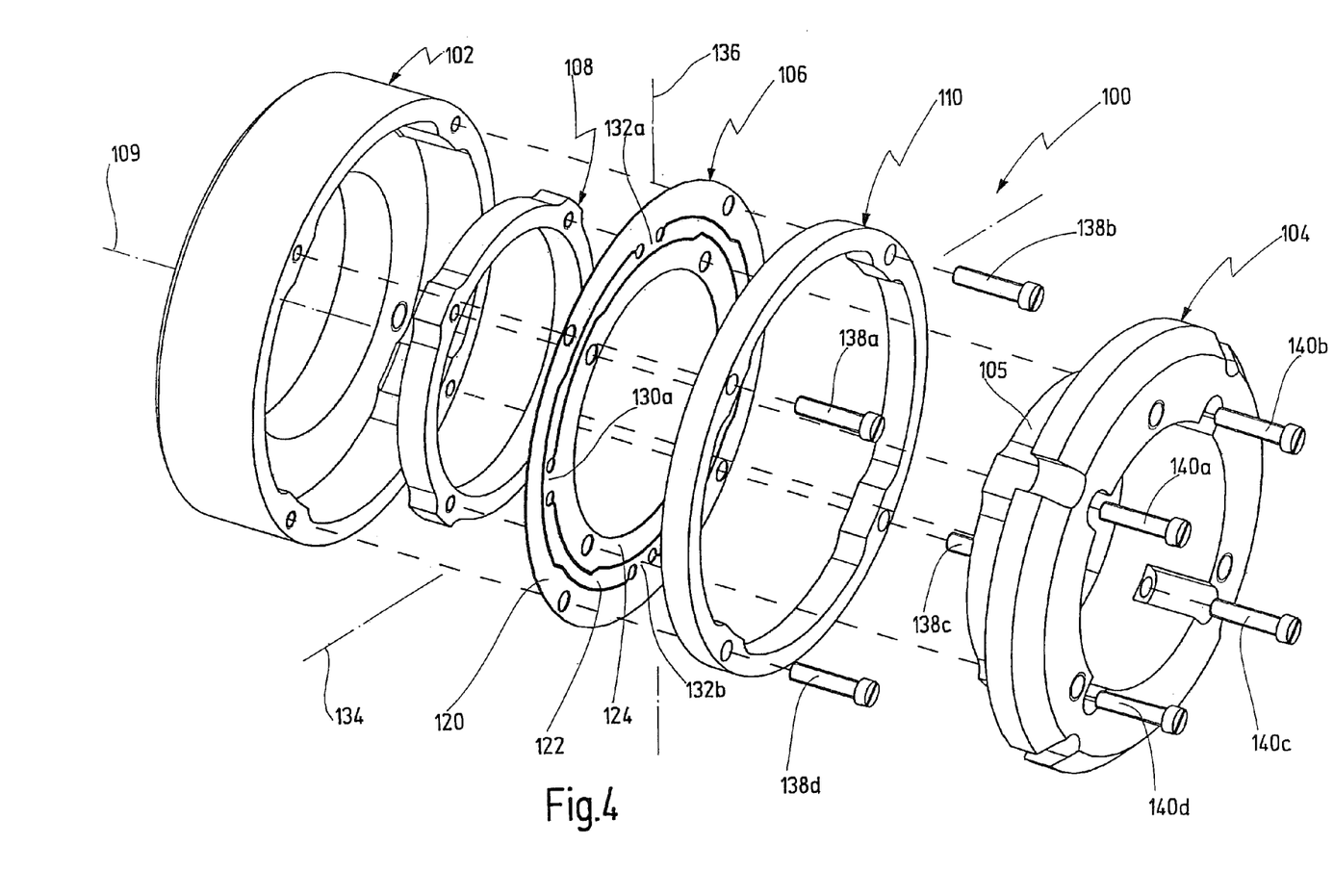
FIG. 4 shows an exploded illustration of a second exemplary embodiment of a joint according to the invention.
Figure 5:
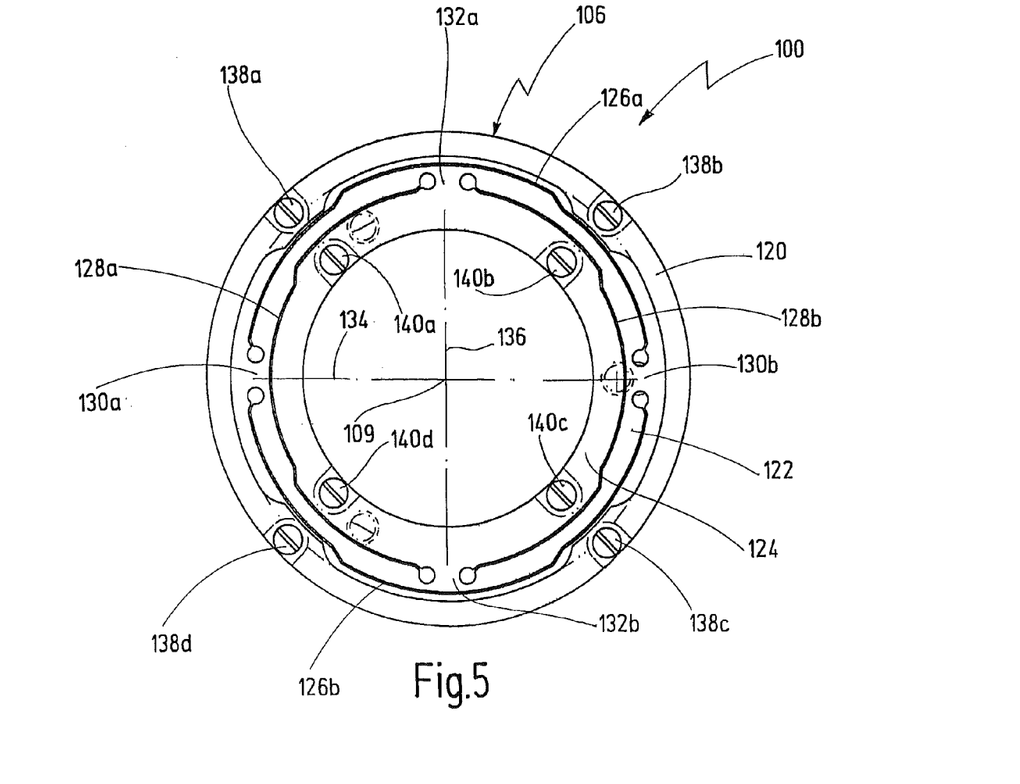
FIG. 5 shows a top view of a membrane spring disk as used in the case of the exemplary embodiment of FIG. 4.

FIGS. 4 and 5 show a second exemplary embodiment of a joint 100 according to the invention.

The joint 100 has a first joint part 102 and a second joint part 104. The second joint part 104 is provided with an axial projection 105 which extends onto the first joint part 102 in the assembled state. Located between the joint parts are a membrane spring ring 106 as well as a first mounting ring 108 and a second mounting ring 110. The above-mentioned elements are arranged in the sequence 102-108-106-110-104 next to one another along an axis 109 of the joint 100.

The membrane spring ring 106, whose details are shown in FIG. 5, is subdivided into three concentric regions, specifically an outer ring portion 120, a middle ring portion 122 and an inner ring portion 124. The outer ring portion 120 is separated from the middle ring portion 122 by two first half ring slots 126*a*, 126*b*. The middle ring portion 122 is separated from the inner ring portion 124 by two second half ring slots 128*a*, 128*b* which are offset in a circumferential direction by 90° in relation to the first half ring slots 126*a*, 126*b*. The ends of the first half ring slots 126*a*, 126*b* are spaced apart from one another and form first spring joint sites 130*a*, 130*b* there. The ends of the second half ring slots 128*a*, 128*b* are spaced apart form one another and form second spring joint sites 132*a*, 132*b* there. The first spring joint sites 130*a*, 130*b* define a first joint axis 134, and the second spring joint sites 132*a*, 132*b* define a second joint axis 136. The joint axes 134 and 136 are perpendicular to one another and to the axis 109.

The second mounting ring 110 and the membrane spring ring 106 are screwed onto the first joint part 102 by means of four first axially arranged screws 138*a*-138*d* distributed over the circumference by 90° in each case. In this case, the first screws 138*a*-138*d* fix the membrane spring ring 106 in the region of the outer ring portion 120, specifically offset by +45° and −45°, respectively, in relation to the second spring joint sites 132*a*, 132*b*.

The second joint part 104 and the membrane spring ring 106 are screwed to the first mounting ring 108 by means of four second axially arranged screws 140*a*-140*d* which are distributed over the circumference by 90° in each case and penetrate the axial projection 105. In this case, the second screws 140*a*-140*d* fix the membrane spring ring 106 in the region of the inner ring portion 124, specifically offset by +45° and −45°, respectively, in relation to the first spring joint sites 130*a*, 130*b*. The axial dimensions are selected in this case such that in the rest position the membrane spring ring 108 is arranged in a radial middle plane of the joint.

Consequently, the first joint part 102 can rotate, relative to the second joint part 104, both about the first joint axis 134 and about the second joint axis 136, which is perpendicular thereto.

Figure 6:
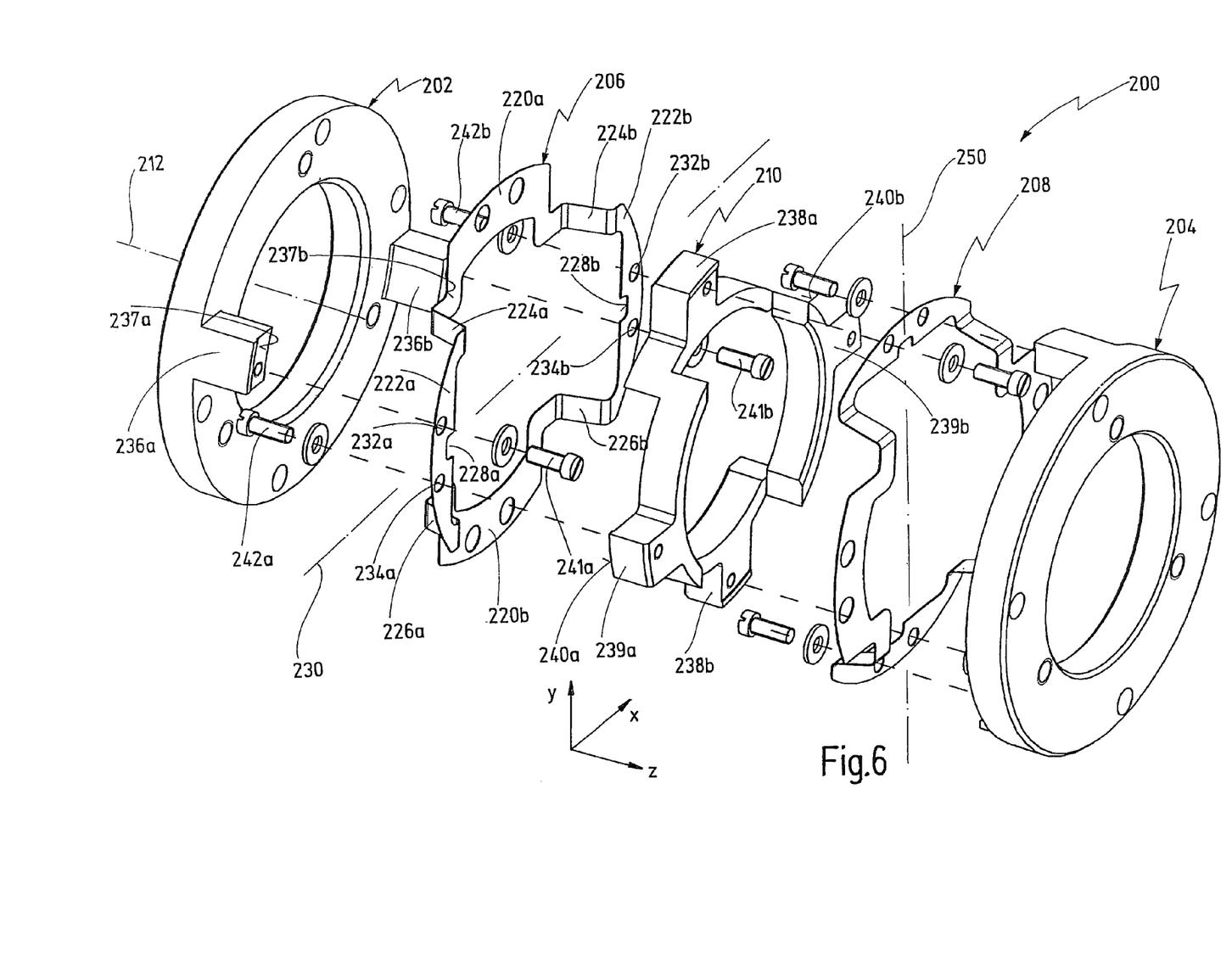
FIG. 6 shows an exploded illustration of a third exemplary embodiment of a joint according to the invention.

FIG. 6 shows a third exemplary embodiment of a joint 200 according to the invention.

The joint 200 has a first joint part 202, a second joint part 204, a first bending spring ring 206 and a second bending spring ring 208. The above-mentioned elements are arranged in a sequence 202-206-210-208-204 next to one another along a common axis 212.

Reference is made for the purpose of explanation to a cartesian coordinate system x-y-z whose z-axis coincides with the axis 212 such that the x-axis and the y-axis extend in the radial direction.

The first bending spring ring 206 is provided with first arcuate portions 220*a* and 220*b* which extend in the x-direction and are located on diametrically opposite sides. Furthermore, provided at an axial spacing therefrom are second arcuate portions 222a, 222b which are likewise diametrically opposite one another and extend in the y-direction. These portions 220a, 220b and 222a, 222b are interconnected via first straight portions 224a, 224b and, respectively, second straight portions 226a, 226b which bridge the axial spacing and run at a slight inclination to the axis 212.

The second arcuate portions 222a, 222b are provided in the middle with recesses 228a and 228b, giving rise to material constrictions which define a first joint axis 230 which runs in the x-direction. Holes 232a, 232b and 234a, 234b, respectively, are provided on both sides of this first joint axis 230.

On its radial surface facing the first bending spring ring 206, the first joint part 202a has axial projections 236a and 236b which are diametrically opposite one another and have radial end faces 237a, 237b.

On its side pointing towards the first bending spring ring 206, the mounting ring 210 is provided with two axial projections 238a and 238b which are diametrically opposite one another and are offset by 90° in a circumferential direction relative to the axial projections 236a and 236b, and which have radial end faces 239a and 239b, respectively. On the side pointing towards the second bending spring ring 208, the mounting ring 210 is provided with two further axial projections 239a and 239b which are likewise diametrically opposite one another, are spaced apart axially from the axial projections 238a and 238b, and are offset by 90° in a circumferential direction relative to the latter.

The first bending spring ring 206 is screwed to the first joint part 202 by means of first screws 241a and 241b, specifically through the holes 232a and 234b, the screws 241a, 241b being screwed axially into the end faces 237a, 237b of the projections 236a, 236b. The first bending spring ring 206 is screwed to the mounting ring 210 by means of second screws 242a and 242b, specifically through the holes 234a and 232b into the end faces 240a and 240b of the projections 239a and 239b, respectively.

The projections 236a and 239a are arranged offset over the circumference, as are the projections 236b and 239b. The spacing between said projections is bridged by the arcuate portions 222a, 222b, the recesses 228a, 228b being located between the projections.

The same configuration is to be found in an axially symmetrical fashion and offset in the circumferential direction by 90° between the mounting ring 210 and the second joint part 204, the result being a second joint axis 250, which is rotated by 90° relative to the first joint axis 230 but is located in the same radial plane, which lies between the axial projections 238a, 238b and 239a, 239b.

FIGS. 7 to 10 show a fourth exemplary embodiment of a joint 300 according to the invention.

The joint 300 has a first joint part 302, a second joint part 304 and a third joint part 306, as well as a torsion spring part 308. The above-mentioned elements are arranged coaxially next to one another or inside one another (compare FIG. 8) along an axis 310. In this case, the first joint part 302 is provided with an axial projection 312 which extends into a central opening in the second joint part 304. The second joint part 304 is located, for its part, inside the third joint part 306. The torsion spring part 308 is arranged in the radial middle plane of the joint 300 and interconnects the joint parts 302, 304 and 306, as explained below.

Figure 10:
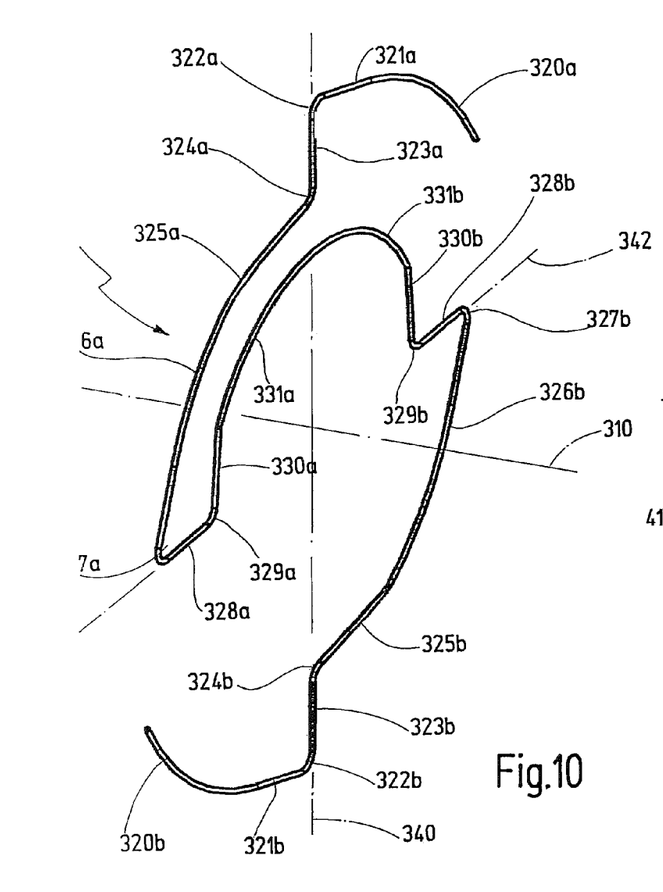
FIG. 10 shows an enlarged illustration of a torsion spring element as used in the exemplary embodiment of FIG. 7.

FIG. 10 shows details of the torsion spring part 308. The torsion spring part 308 consists of a piece of resilient wire, portions of which are bent within a plane in the following way:

Provided at its upper free end in FIG. 10 is a first, upwardly bent portion 320a adjoined by a horizontal first straight portion 321a. On the end thereof is a first 90° arc 322a leading downwards to the left. Adjacent thereto is a first, vertical straight torsion portion 323a, there then following a second 90° arc 324a leading to the left, a second straight portion 325a leading obliquely downwards to the left, a second bent portion 326a pointing downwards, a third 90° arc 327a leading to the right, a second, horizontal straight torsion portion 328a, a fourth 90° arc leading upwards, a third straight portion 330a leading obliquely upwards to the right and, finally, a third portion 331a bent upwards to the right and ending in alignment with the first torsion portion 323a.

The term "90° arc" is understood in the present description not as referring to the exact value of 90°, but as being only an approximate value. "Bent" is to be understood as a curve that lies substantially on a circular line about the axis 310.

The third bent portion 331a is now adjoined by portions 331b, 330b and 328b in a fashion exhibiting mirror symmetry in relation to a vertical axis containing the first torsion portion 323a. From there on, the torsion spring part 308 is designed with point symmetry in relation to the point of intersection of said vertical axis and the axis 310, and therefore continues from portion 328b with portions 326b, 325b, 324b, 323b, 322b, 321b and 320b, the portions denoted by "b" corresponding in their point-symmetrical arrangement to the portions denoted further above by "a".

The torsion spring part 308 therefore defines two joint axes which are perpendicular to one another, specifically a first, vertical joint axis 340 in which the two vertical, first straight torsion portions 323a and 323b act, as well as a second, horizontal joint axis 342 in which both horizontal, second straight torsion portions 328a and 328b act.

Figure 7:
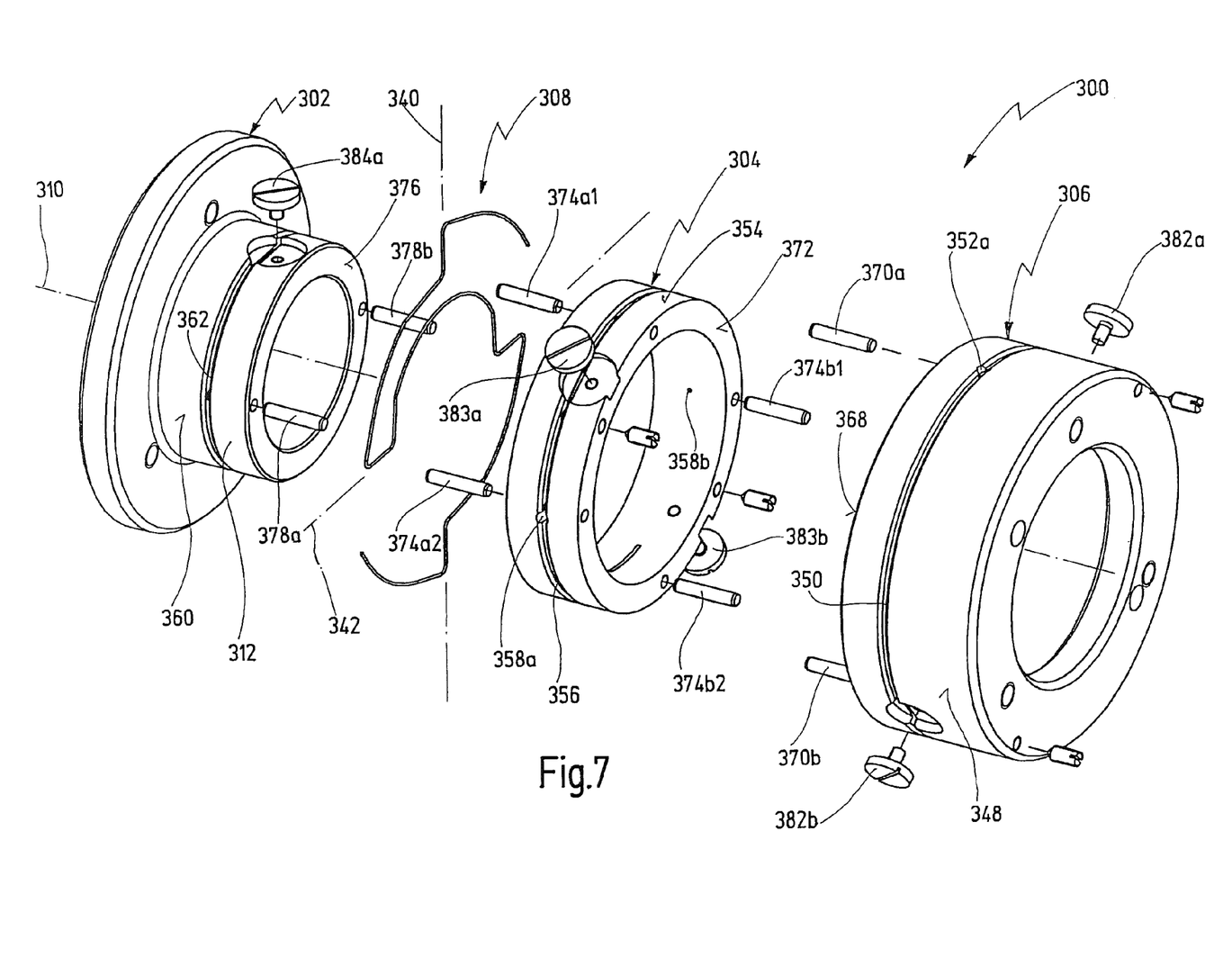
FIG. 7 shows an exploded illustration of a fourth exemplary embodiment of a joint according to the invention.

A cylindrical surface 348 of the third joint part 306 is provided with a first circumferential groove 350. Radial through bores 352a and 352b aligned with one another along a diameter are provided in the first circumferential groove 350.

A cylindrical surface 354 of the second joint part 304 is provided with a second circumferential groove 356. Radial through bores 358a and 358b aligned with one another along a diameter are provided in the second circumferential groove 356.

A cylindrical surface 360 of the first joint part 302 is provided with a third circumferential groove 362.

At positions which are diametrically opposite and symmetrical in relation to the axis 310, two first axial pins 370a and 370b are inserted into a first radial end face 368 of the third joint part 306.

At positions which are diametrically opposite and symmetrical in relation to the axis 310, four second axial pins 374a1, 374a2, 374b1 and 374b2 are inserted into a second radial end face 372 of the second joint part 304. The second pins 374a1 and 374b2 in this case approximately align radially with the first pins 370a and 370b, as follows from FIG. 9.

At positions which are diametrically opposite and symmetrical in relation to the axis 310, two third axial pins 380a and 380b are inserted into a third radial end face 376 of the axial projection 312 of the first joint part 302. The third pins 380a and 380b in this case approximately align radially with the second pins 374a2 and 374b1, as follows from FIG. 9.

Figure 8:
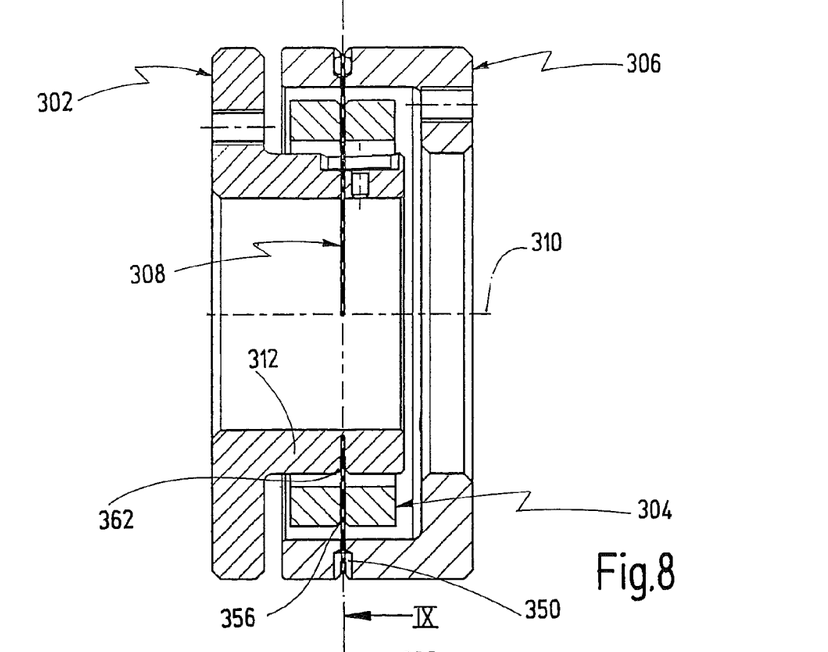
FIG. 8 shows a first radial sectional illustration of the exemplary embodiment of FIG. 7 along the line VIII-VIII of FIG. 9.

As may be seen from the axial section of FIG. 8, the three joint parts 302, 304 and 306 of the joint 300 are interconnected in such a way that the three circumferential grooves 350, 356 and 362 are located in a fashion aligned with one another in the radial middle plane. The torsion spring part is inserted into these three circumferential grooves 350, 356 and 362, and wound around the pins 370a, b, 374a1, a2, b1 b2 and 380a, b with its 90° arcs 322a, b, 324a, b, 327a, band 329a, b.

Figure 9:
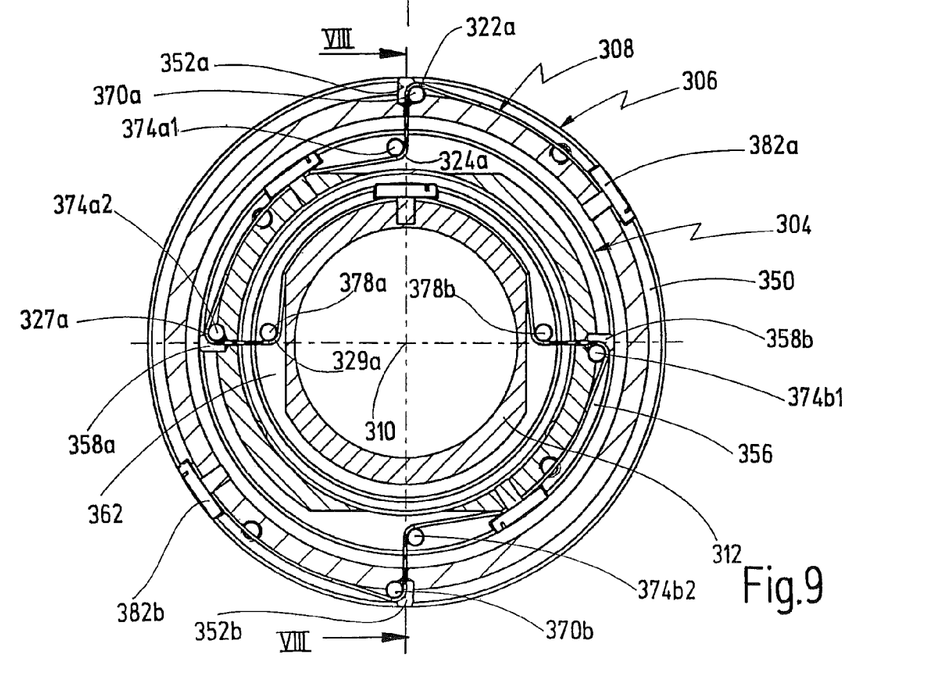
FIG. 9 shows a second radial sectional illustration of the exemplary embodiment of FIG. 7 along the line IX-IX of FIG. 8.

It may be seen from FIG. 9 that the first bent portion 320a rests on the base of the first circumferential groove 350. The first 90° arc 322a winds around the first pin 370a. The first torsion portion 323a leads through the radial bore 352a. The second 90° arc 324a winds around the second pin 374a1. The second bent portion 326a rests on the base of the second circumferential groove 356. The third 90° arc 327a winds around the second pin 374a2. The second torsion portion 328a leads through the radial bore 358a. The third bent portion 331a rests on the base of the third circumferential groove 362. Starting from there, the path of the portions 331b to 320b of the torsion spring part 308 continues in the way described above with mirror or folding symmetry.

As a result, the first joint part 302 can therefore rotate about the second, horizontal joint axis 342 relative to the second joint part 304, and the second joint part 304 can rotate about the first, vertical joint axis 340 relative to the third joint part 306. The rotation angle or torsion angle is preferably ±5°, it being possible to set this angle via the length of the torsion portions 323 and 328, for example.

With its free portions, that is to say portions which do not rest under stress on the base of the circumferential grooves 350, 356 and 362, apart from the rotary movement about the joint axes 340 and 342 the joint 300 can also absorb and damp axial and radial movements.

The joint 300 can have also four separate torsion bars with regard to the rotary movement about the joint axes 340 and 342.

Figure 11:
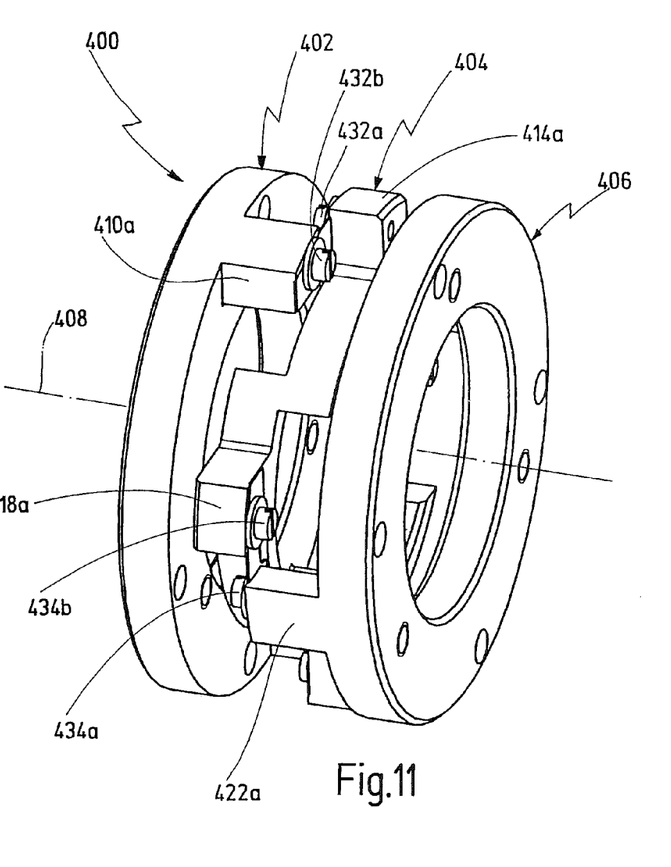
FIG. 11 shows a perspective illustration of a fifth exemplary embodiment of a joint according to the invention.
Figure 12:
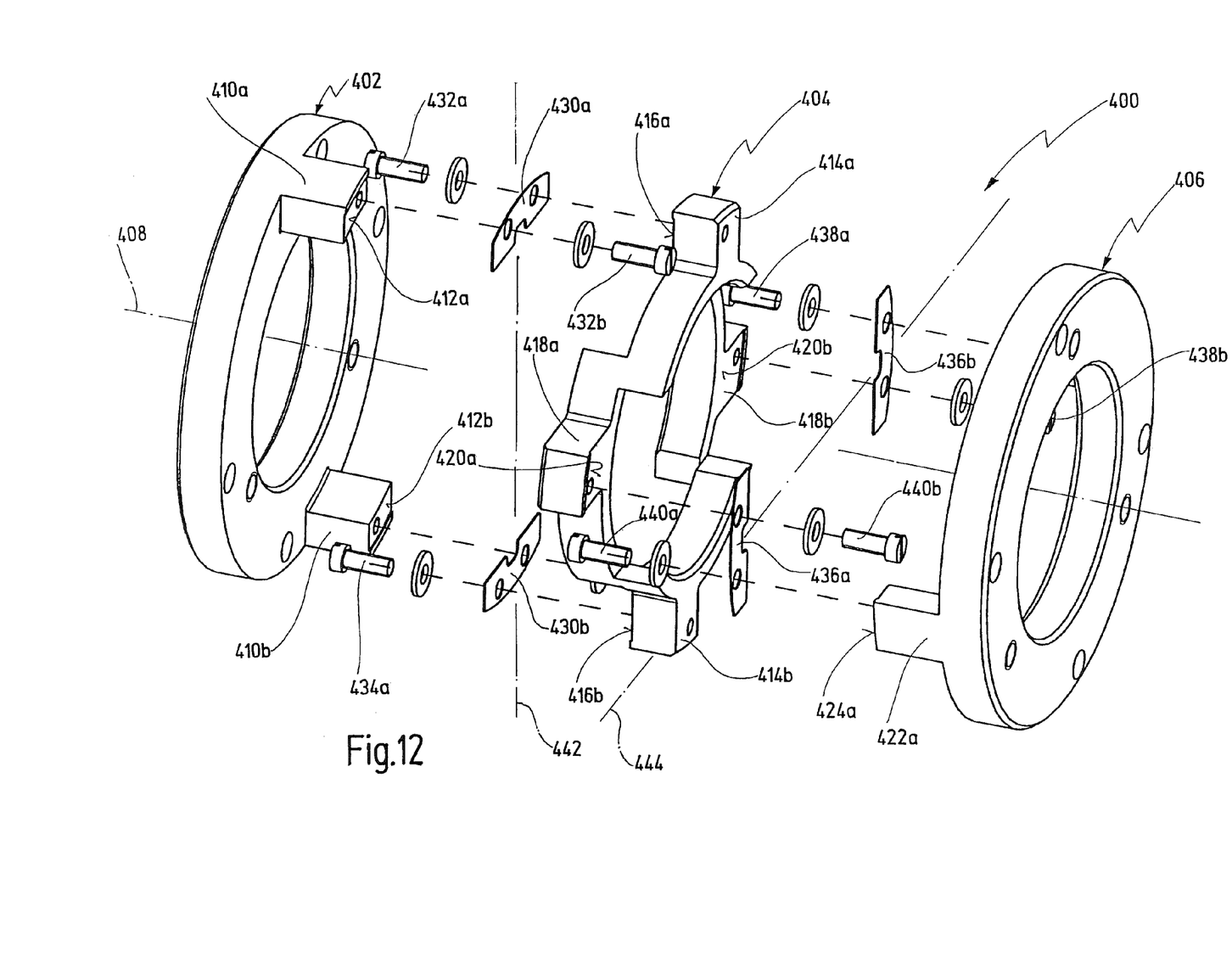
FIG. 12 shows an exploded illustration of the exemplary embodiment of FIG. 11.
Figure 13:
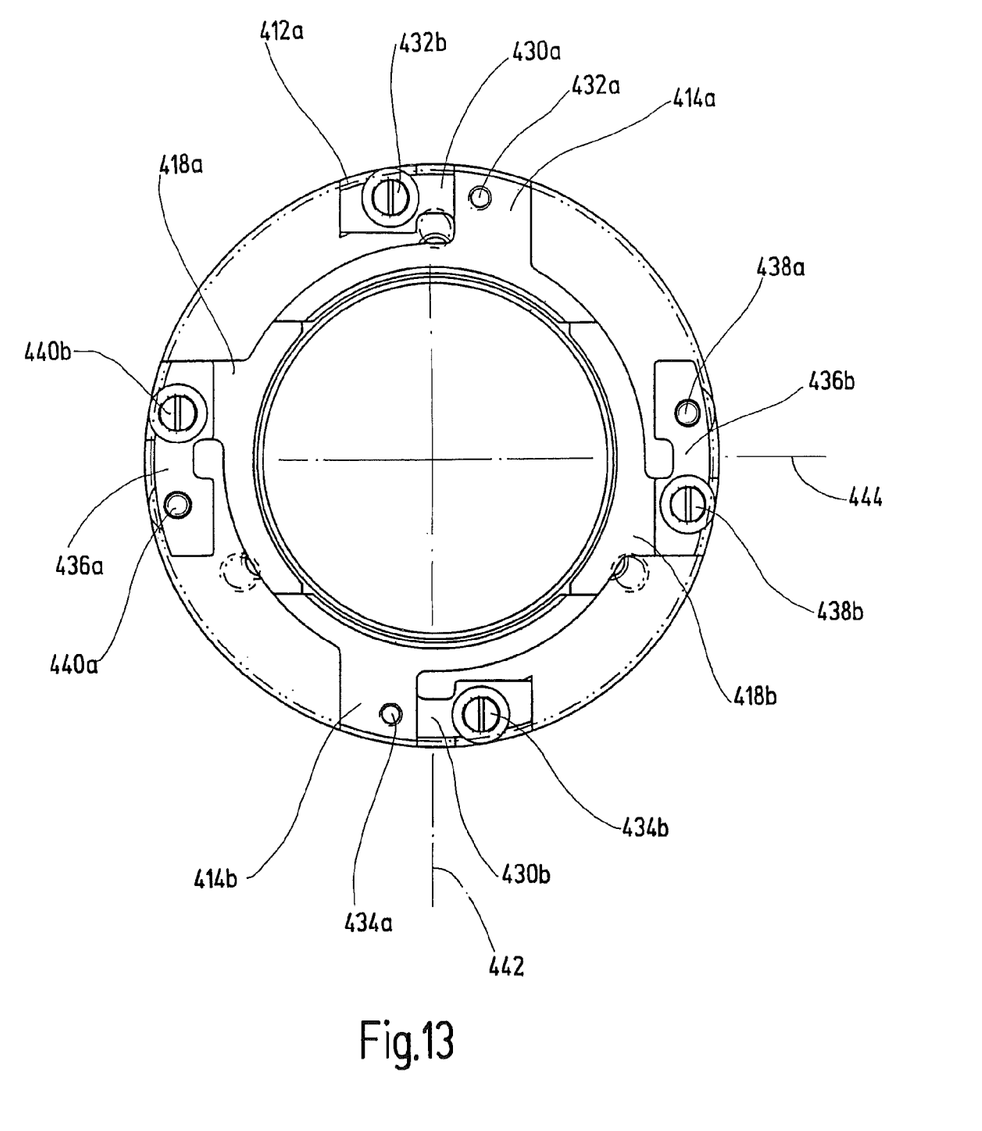
FIG. 13 shows an axial view of the exemplary embodiment of FIG. 11 in a partially mounted fashion.

FIGS. 11 to 13 show a fifth exemplary embodiment of a joint 400 according to the invention.

The joint 400 has a first joint part 402, a second joint part 404 and a third joint part 406 which are arranged next to one another along an axis 408.

The first joint part 402 has two first axial projections 410a and 410b which are diametrically opposite one another and arranged symmetrically relative to the axis 408 and point to the right in FIG. 12. The projections 410a and 410b have first radial end faces 412a and 412b, respectively.

The second joint part 404 has two second axial projections 414a, 414b which are diametrically opposite one another and arranged symmetrically relative to the axis 408 and point to the left in FIG. 12. The projections 414a and 414b have second radial end faces 416a and 416b, respectively.

The second joint part 404 further has two third axial projections 418a, 418b which are diametrically opposite one another and are arranged symmetrically in relation to the axis 408 and point to the right in FIG. 12. The projections 418a and 418b have third radial end faces 420a and 420b, respectively.

The third joint part 406 has two fourth axial projections, from which only fourth axial projections 422 can be seen, which are diametrically opposite one another and arranged symmetrically relative to the axis 408 and point to the left in FIG. 12. The projections have second radial end faces, respectively, from which only radial and fourth 424a can be seen.

With its side on the right in FIG. 12, an upper first horizontal leaf spring 430a is screwed by means of a screw 432a against the end face 416a of the upper second projection 414a, and with its left side it is screwed with the aid of a screw 432b against the end face 412a of the upper first projection 410a. With its side on the right in FIG. 12, a lower first leaf spring 430b is screwed by means of a screw 434b against the end face 412b of the lower first projection 410b, and with its left side it is screwed by means of a screw 434a against the end face 416b of the lower second projection 414b.

Second vertical leaf springs 436a, 436b are screwed in a corresponding way between the second joint part 404 and the third joint part 406 by means of screws 438a, b and 440a, b, as is to be seen in detail in FIG. 12.

The projections 414 and 418 on the second joint part 404 are axially offset in such a way that all the leaf springs 430a, 430b and 436a, 436b lie in the same radial middle plane of the joint 400, as is clearly illustrated in FIG. 11. FIG. 13 further shows that the projections 410a, 410b, 414a, 414b, 418a, 418b and 422a, 422b are distributed over the circumference in such a way that middle regions of the leaf springs 430a, 430b and 436a, 436b are distributed over the circumference by 90° and therefore form a first, vertical joint axis 442 and a second, horizontal joint axis 444.

The first joint part 402 can therefore be rotated about the first joint axis 442 relative to the second joint part 404 and the second joint part 404 can likewise be rotated about the second joint axis 444 relative to the third joint part 406.

What is claimed is:

1. A telescope, comprising:
a housing,
an optical assembly arranged in said housing,
a joint for universally bearing said optical assembly, said joint being designed as a leaf spring joint, and
wherein said joint has a first joint part, a second joint part and a third joint part which are arranged next to one another along an axis, wherein said first joint part is connected to said second joint part via two first leaf springs, which lie diametrically opposite one another relative to said axis and lie in a radial plane, wherein said second joint part is connected to said third joint art via two second leaf springs, which are diametrically opposite one another relative to said axis and lie in a radial plane, wherein said pairs of leaf springs define with their regions between fastening points with said joint parts a first joint axis and a second joint axis, and wherein said joint axes are perpendicular to one another.

2. The telescope of claim 1, wherein said joint parts have projections, which point to one another and are arranged offset over the circumference, and on whose radial end faces said leaf springs are fastened.

* * * * *